April 18, 1933.  R. O. LUND  1,904,063
FIRE HOSE RACK
Filed Aug. 25, 1931  2 Sheets-Sheet 1
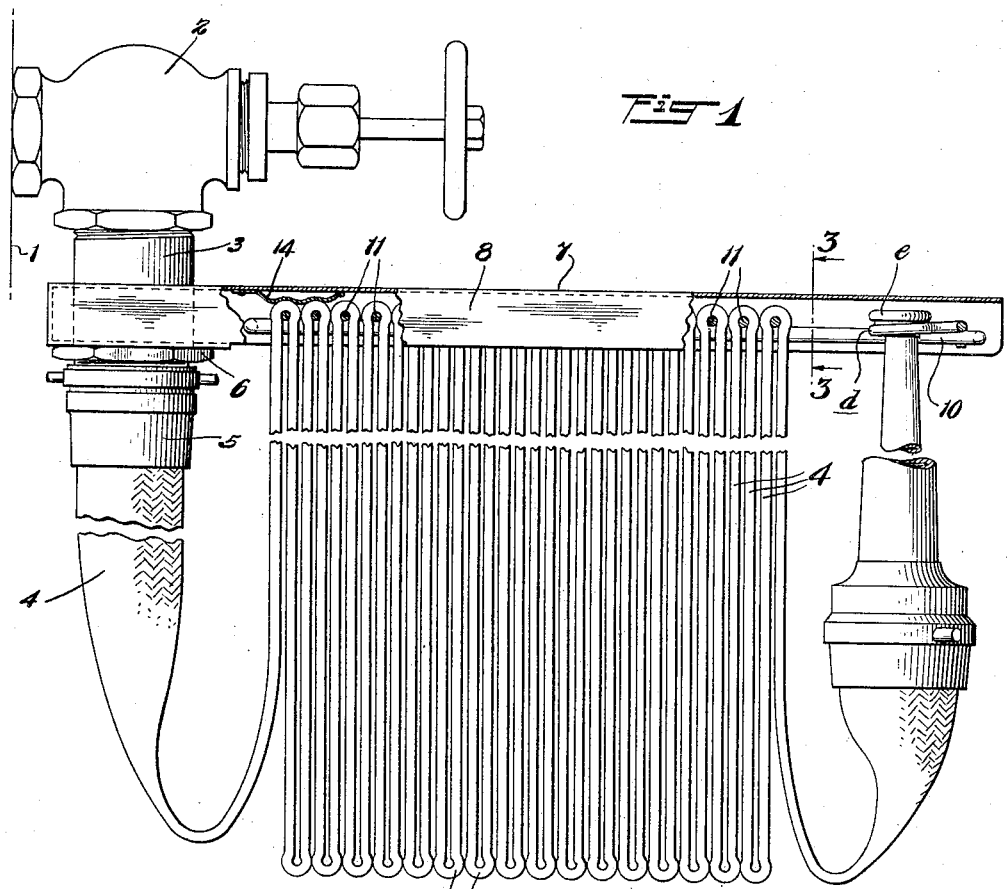
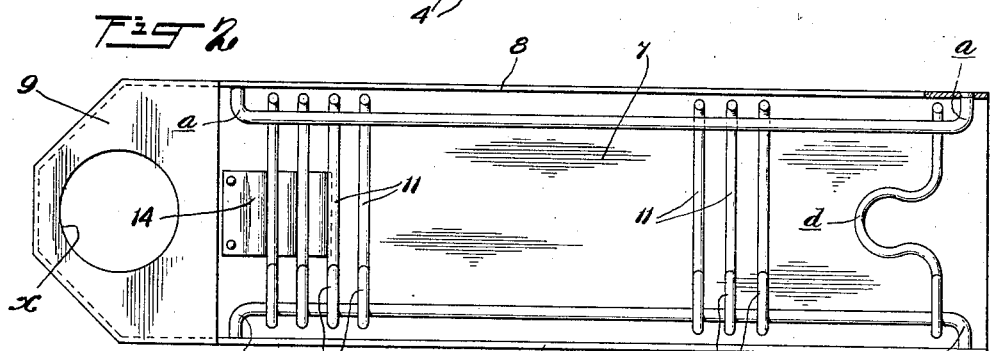
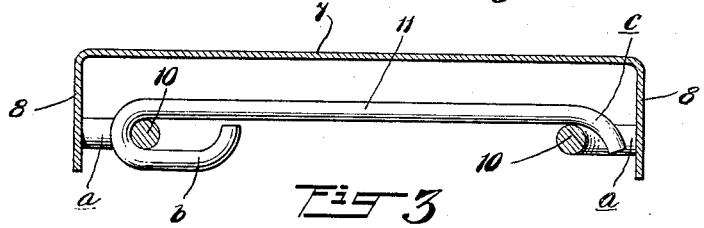
INVENTOR
Rudolph O. Lund,
BY
ATTORNEY.

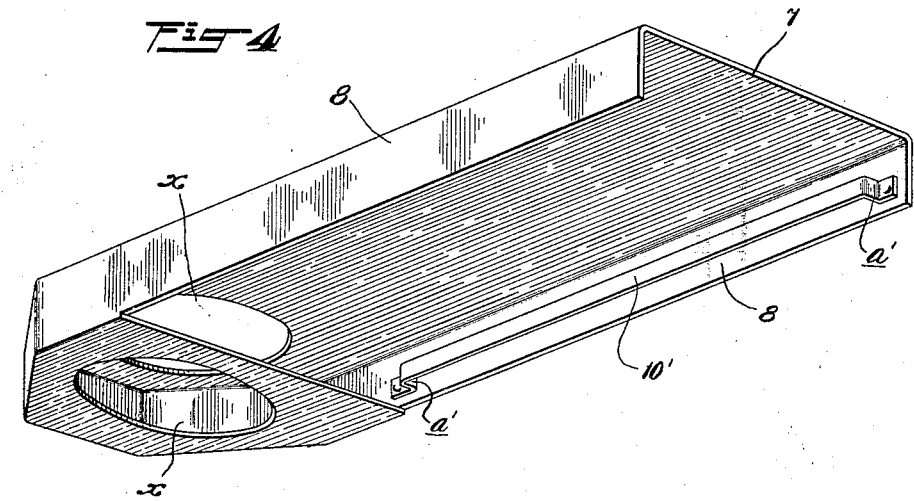
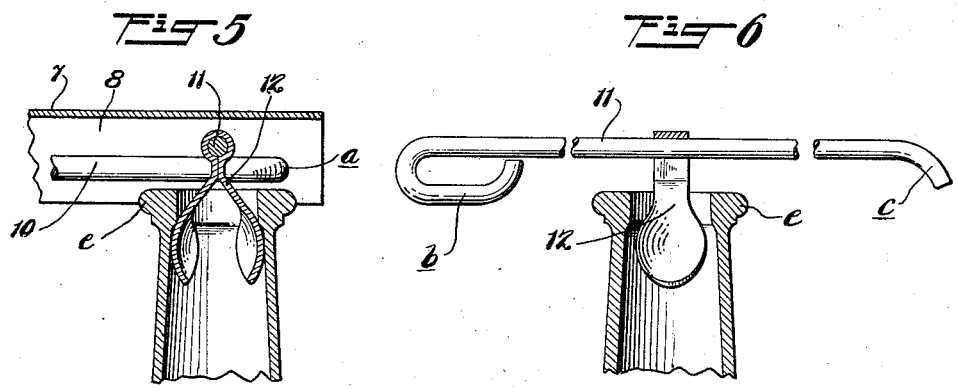
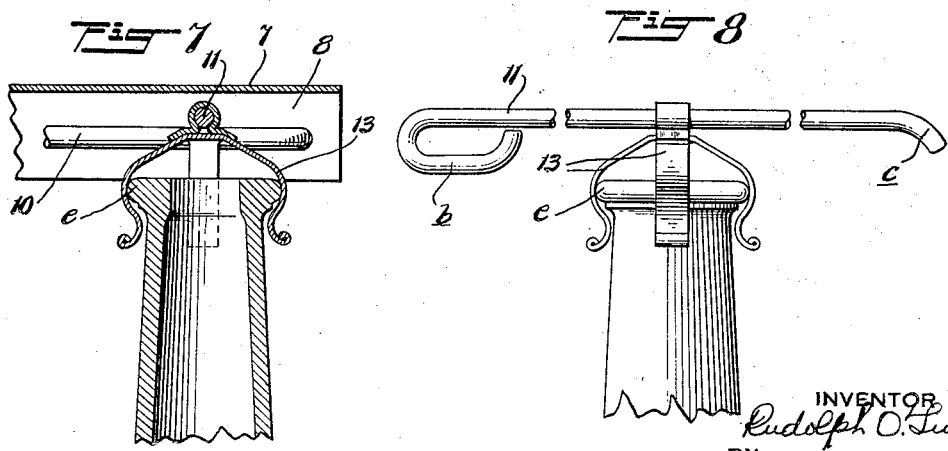

Patented Apr. 18, 1933

1,904,063

UNITED STATES PATENT OFFICE

RUDOLPH O. LUND, OF NEW YORK, N. Y.

FIRE HOSE RACK

Application filed August 25, 1931. Serial No. 559,195.

This invention relates to improvements in hose racks adapted to support a fire hose in the customary folded condition ready for instant release and has for its particular objects to increase the facility with which the hose can be released and controlled while being so released, as well as the provision of means for supporting the nozzle beneath the top of the rack and to otherwise provide an attractive, efficient and cheap construction.

In the accompanying drawings, in which I have illustrated a preferred form of my invention, Figure 1 is a side elevation, partly in section, of my improved rack showing a hose supported in a stored or folded position therein;

Fig. 2 is a bottom plan view of the rack proper with the hose removed;

Fig. 3 is a vertical cross section on the line 3—3 of Fig. 1, but with the hose removed;

Fig. 4 is a perspective view, viewed from below, of the shell or casing;

Fig. 5 is a fragmentary vertical section showing a modified form of nozzle clip and Fig. 6 is a similar fragmentary vertical section taken at right angles to that shown in Fig. 5;

Fig. 7 is a fragmentary vertical section; and

Fig. 8 is a fragmentary elevation of a still different form of nozzle clip.

Referring to the drawings and the construction shown therein, the reference numeral 1 designates a stand pipe and 2 an outlet valve controlling the flow of water from the stand pipe through a union 3 to the bottom of which latter a hose 4 is secured by means of a coupling 5. A nut 6 is threaded on said union 3 and serves to support a metal frame comprising a top 7, integral sides 8 and a bottom plate 9. Said top 7 and plate 9 have registering apertures $x$ adapted to snugly receive said union 3, but the same are of substantially smaller diameter than the overall diameter of the nut 6 whereby, when the latter is in position on the union 3 as indicated in Fig. 1, it serves to maintain said rack at right angles to the axis of said union.

The said frame is preferably of rectangular configuration and comprises essentially an inverted trough which serves as a canopy and support for the hose and the nozzle thereof. Said frame is provided with longitudinal supporting bars 10, which are of rod form (Figs. 1 and 2) or bars 10' which are of strip form (Fig. 4), and, as shown, said members 10 or 10' are of elongated U-shape, the ends $a$ or $a'$ (Fig. 4) thereof being secured by brazing, welding or riveting to the sides 8 of said frame.

Hose supporting pins or cross bars 11, each having an eye or loop $b$ at its inner end for pivotally and permanently securing the same to one of the bars 10 or 10', are adapted to each support a separate fold of the hose and the same normally rest upon and are supported by the opposing longitudinal bar or member 10 or 10'. However, owing to the curvature of the outer or free end $c$ of each cross-bar, the same conforming to an arc of less than 90°, said cross arms are adapted to automatically ride up and over the front end $a$ or $a'$ of the side bars and thereby successively release the hose one fold at a time when the fireman withdraws the nozzle from the nozzle clip (hereinafter described) and drags the hose after him as he rushes toward the scene of action.

A nozzle clip is secured to the under side of the frame to support the nozzle beneath the top 7 thereof and thereby prevent the projection thereinto of cigarette or cigar butts or other objects or substances which might injure the hose fabric or even clog the nozzle. Such clip may be formed as an integral part of the end cross-bar by forming a central loop $d$ thereon of the proper size to embrace the reduced portion of the nozzle immediately below the enlarged tip $e$ thereof or the same may be formed as a separate expansible clip 12 frictionally or otherwise secured to the cross pin 11 or a contractile clip 13 may be similarly secured to such cross pin.

At the inner or rear end of the frame I preferably provide a compression leaf spring member 14, the same being riveted at one end to the top 7 of the frame and preferably being corrugated to conform to the curvature of the contacting loops of the hose. Said clip is designed to compress the portions of the inner loops of the hose against the two innermost cross-bars 11 and thereby temporarily restrict the flow of water through the nozzle until the entire hose has been completely dragged out and released from the frame, whereby the nozzle can be more easily handled and controlled by a single fireman than would be possible were the flow of water, during the period that the hose is being withdrawn, unrestricted other than by the numerous folds of the hose.

Having thus described my invention, what I claim and desire to obtain by United States Letters Patent is:

1. In a fire hose rack, the sub-combination comprising a longitudinal frame, a pair of skeleton supports secured to opposite sides thereof and being spaced therefrom throughout the greater portion of the length of such supports and said supports each having in-turned ends which are secured to said frame, a plurality of hose supporting pins pivotally connected to one of said supports and of sufficient length to span the intervening space between said supports, said pins having arc-shaped ends of a curvature of less than 90° and insufficient to permit of the extreme ends of said pins projecting below the bottom of the support on which they rest, whereby when such free ends are respectively forcibly projected against the end of one of said supports when resting thereon, the same will ride upwardly and over the end of such support, but said free end of said pin is normally prevented from becoming accidentally disengaged from the support upon which it rests.

2. In a fire hose rack, the combination comprising a channelled frame having a closed top and a partially closed bottom, and provided with registering apertures extending through said top and said partially closed bottom adapted to receive a coupling union, opposing bars secured to opposite sides of said channelled frame, the same being spaced therefrom throughout the greater portion of the length thereof, and said bars each having in-turned ends which serve to secure the same to said channelled member, hose-supporting pins mounted at intervals on one of said bars, each of said pins being of sufficient length to span the intervening space between said bars and said pins, each having arched free ends of a curvature less than a quadrant of a circle and insufficient to permit of projection of the extreme ends of such pins below the bar on which they rest and the outermost one of said pins being looped to form a nozzle support.

Signed at New York, in the city, county and State of New York, this 19 day of Aug. 1931.

RUDOLPH O. LUND.